United States Patent
Kisch et al.

(10) Patent No.: US 11,742,715 B2
(45) Date of Patent: Aug. 29, 2023

(54) ELECTRIC MOTOR WITH HEAT DISSIPATION FOR THE MOTOR SHAFT BEARING

(71) Applicant: ebm-papst St. Georgen GmbH & Co. KG, St. Georgen (DE)

(72) Inventors: Michael Kisch, St. Georgen (DE); Wilhelm Weisser, Königsfeld/Buchenberg (DE); Jochen Scheffczyk, Villingen-Schwenningen (DE); Hassan Ghodsi-Khameneh, St. Georgen (DE); Daniel Hauer, Ortenberg (DE); Marcus Hellmann, Unterkirnach (DE); Alexander Zwetkow, Rottweil (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 289 days.

(21) Appl. No.: 17/266,144

(22) PCT Filed: Aug. 20, 2019

(86) PCT No.: PCT/EP2019/072301
§ 371 (c)(1),
(2) Date: Feb. 5, 2021

(87) PCT Pub. No.: WO2020/048773
PCT Pub. Date: Mar. 12, 2020

(65) Prior Publication Data
US 2021/0376694 A1    Dec. 2, 2021

(30) Foreign Application Priority Data

Sep. 7, 2018   (DE) ..................... 10 2018 121 923.7

(51) Int. Cl.
*H02K 5/16* (2006.01)
*H02K 5/173* (2006.01)
(Continued)

(52) U.S. Cl.
CPC .......... *H02K 5/1732* (2013.01); *H02K 7/003* (2013.01); *H02K 9/223* (2021.01); *H02K 9/227* (2021.01); *H02K 2211/03* (2013.01)

(58) Field of Classification Search
CPC ...... H02K 5/1732; H02K 9/227; H02K 9/223; H02K 7/003; H02K 2211/03
(Continued)

(56) References Cited

U.S. PATENT DOCUMENTS 3,717,779 A    2/1973  Hallerback
4,533,891 A    8/1985  Vanderlaan et al.
(Continued)

FOREIGN PATENT DOCUMENTS

DE    19624145 A1    1/1998
DE    102012008652    * 11/2013    ............. H02K 7/116
(Continued)

OTHER PUBLICATIONS

International Search Report and Written Opinion of the International Searching Authority, issued in PCT/EP2019/072301, dated Nov. 27, 2019; ISA/EP.
German Search report issued in co pending application DE102018121923.7.

*Primary Examiner* — Terrance L Kenerly
(74) *Attorney, Agent, or Firm* — Harness, Dickey & Pierce, P.L.C.

(57)    ABSTRACT

A motor housing (2) has a shaft section to receive a motor shaft (4) and a motor section to receive motor electronics (5) and motor windings (6). The shaft section and the motor section are separated from each other in a sealed manner by
(Continued)

a separating pot (7) arranged in the motor housing (2). A metal ball bearing pot (8) with a ball bearing (9) is arranged in the separating pot. The ball bearing pot (8) lies indirectly against a motor housing section that is connected to the outer surroundings, via the separating pot (7). Thus, the motor housing functions as a cooling body. Accordingly, heat generated by the ball bearing (9) during operation is dissipated onto the motor housing and the outer surroundings, via the ball bearing pot (8) and the separating pot (7).

16 Claims, 2 Drawing Sheets

(51) Int. Cl.
*H02K 7/00* (2006.01)
*H02K 9/22* (2006.01)

(58) Field of Classification Search
USPC ..................................................... 310/43, 87
See application file for complete search history.

(56) References Cited

U.S. PATENT DOCUMENTS 4,933,581 A 6/1990 Shramo
6,091,174 A 7/2000 Genster

FOREIGN PATENT DOCUMENTS

| DE | 102013202335 A1 | 8/2014 |
|---|---|---|
| EP | 0160132 A1 | 11/1985 |
| WO | WO-2015063882 A1 | 5/2015 |

* cited by examiner

ELECTRIC MOTOR WITH HEAT DISSIPATION FOR THE MOTOR SHAFT BEARING

CROSS-REFERENCE TO RELATED APPLICATIONS

This application is a 371 U.S. National Phase of International Application No. PCT/EP2019/072301, filed Aug. 20, 2019, which claims priority to German Patent Application No. 10 2018 121 923.7, filed Sep. 7, 2018. The entire disclosures of the above applications are incorporated herein by reference.

BACKGROUND

The disclosure relates to a compact electric motor of design with heat dissipation for the motor shaft bearing.

In electric motors, that generate a high rotational speed of the motor shaft, the power dissipation of the ball bearing where the motor shaft is mounted considerably increases due to strong heat development. Especially in compact electric motor designs, where the ball bearing is arranged directly adjoining numerous other components, the generated heat cannot be dissipated to a sufficient extent.

Therefore, the underlying aim of the invention is to provide, in an electric motor, improved heat dissipation for the ball bearing where the motor shaft is mounted.

SUMMARY

This aim is achieved by the combination of features including an electric motor with a motor housing comprising: a shaft section for receiving a motor shaft and a motor section for receiving motor electronics and motor windings, the shaft section and the motor section are separated from each other in a sealed manner by a separating pot arranged in the motor housing, a metal ball bearing pot is arranged in the separating pot, a ball bearing is fixed in the ball bearing pot, the ball bearing pot lies indirectly against a motor housing section that is connected to outer surroundings, via the separating pot such that the motor housing functions as a cooling body; and heat generated by the ball bearing during operation is dissipated onto the motor housing and the outer surroundings via the ball bearing pot and the separating pot.

According to the disclosure, an electric motor with a motor housing has a shaft section to receive a motor shaft and a motor section to receive motor electronics and motor windings. The shaft section and the motor section are separated in a sealed manner from one another by a separating pot arranged in the motor housing. In the separating pot, a metal ball bearing pot is arranged, where a ball bearing is fixed. The ball bearing pot lies indirectly against a motor housing section that is connected to the outer surroundings, via the separating pot. Thus, the motor housing functions as a cooling body and heat generated by the ball bearing during operation is dissipated onto the motor housing and the outer surroundings, via the ball bearing pot and the separating pot.

The separating pot is used in order to separate the shaft section and the motor section. This is to prevent gas exchange between crankcase and electronics or motor windings.

However, the separating pot with the ball bearing pot arranged therein leads to a design where the ball bearing has to be arranged highly centrally packed and is able to dissipate little of the heat generated during operation.

According to the disclosure, the heat dissipation onto the motor housing occurs due to a connection of the separating pot and the ball bearing pot to the received ball bearing.

In an embodiment variant of the electric motor, the separating pot is formed as a single piece through the motor housing around a rotation axis of the motor shaft. In particular, the motor housing forms a circumferential outer wall that, on an axial side, is adjoined by an axial wall where the separating pot is sunk. The separating pot is preferably designed in the shape of a hollow cylinder with sections of different diameter. The ball bearing pot is arranged in the section of the ball bearing pot axially protruding farthest into the motor housing.

Here, an advantageous embodiment is one where the separating pot and the ball bearing pot are designed to be of identical shape in the section of the separating pot where the ball bearing pot is arranged. In other words, the ball bearing pot and the separating pot determine the same outer contours.

In an advantageous embodiment of the electric motor, a heat sink paste is provided between the separating pot and the section of the motor housing that is indirectly connected to the ball bearing pot, via the separating pot. The heat sink paste, preferably, forms an intermediate layer and provides a heat connection of the motor housing to the separating pot, without the components touching. Thus, vibrations of the individual components remain uncoupled from one another.

In a development of the electric motor the motor housing has a detachable housing cover that can be put on an axial side of the remainder of the motor housing. Thus, it forms the section of the motor housing that heat dissipation is indirectly connected to the ball bearing pot and therefore the ball bearing via the separating pot. To the extent that the separating pot forms a single piece with the motor housing, the mounting of the components of the electric motor can occur via the side axially facing the separating pot, on which side the housing cover is removably positioned. At the same time, the solution with a housing cover as a cooling body provides a large surface area for heat dissipation.

The heat dissipation performance is further improved in a variant of the electric motor where the housing cover has a cooling element protruding axially in the direction of the ball bearing pot. This locally increases a surface for connection to the ball bearing pot indirectly via the separating pot.

In an advantage embodiment, that the cooling element is designed to be of cylindrical or conical shape with an axial surface for connection to an axial outer wall of the separating pot. Thus, the heat of the ball bearing is transmitted from the ball bearing pot to the separating pot. Further, it is transferred from the axial outer wall surface to the connection surface of the cylindrical cooling element, and finally to the entire surface of the housing cover.

In a preferred embodiment, the ball bearing pot forms a ball bearing seat where the ball bearing is pressed.

In addition, in a variant of the electric motor the ball bearing pot has a free space between the ball bearing and the section of the motor housing that is connected to the outer surroundings. Thus, the ball bearing can directly dissipate heat to the air into the free space and is not directly connected to the axial surface of the ball bearing pot that adjoins the separating pot and the cooling body.

Furthermore, in the electric motor, in a development, the separating pot extends axially through the motor housing up to the housing cover. The separating pot thus determines, in axial direction, along the rotation axis of the motor shaft, a considerable portion of the centrally internal motor housing around the rotation axis. Preferably, the separating pot extends in axial direction over 60-95%, more preferably over 70-95%, furthermore preferably over 80-90% of the total axial extent of the motor housing.

In an advantageous embodiment example, the motor housing and the separating pot are made of plastic and the metal ball bearing pot is directly overmolded with plastic in the injection molding process.

For a compact design, in the electric motor, it is advantageously provided that the windings enclose the separating pot in circumferential direction. At the same time, it is advantageous that the windings are arranged axially spaced from the ball bearing. Thus, the heat development of the motor windings remains separated from the heat development of the ball bearing.

It is also advantageous for a compact design of the electric motor that the motor electronics are arranged on a circuit board that has a central opening. The cooling element protrudes from the housing cover and extends through the central opening. Alternatively to this, the separating pot extends through the central opening. Furthermore, alternatively, the heat dissipation can also occur directly via the circuit board. Then, the central opening can also be dispensed with.

DRAWINGS

The drawings described herein are for illustrative purposes only of selected embodiments and not all possible implementations, and are not intended to limit the scope of the present disclosure.

Other advantageous developments of the invention are characterized in the dependent claims and represented in further detail together with the description of the preferred embodiment of the invention in reference to the figures. In the drawings:

DETAILED DESCRIPTION

Figure 1:
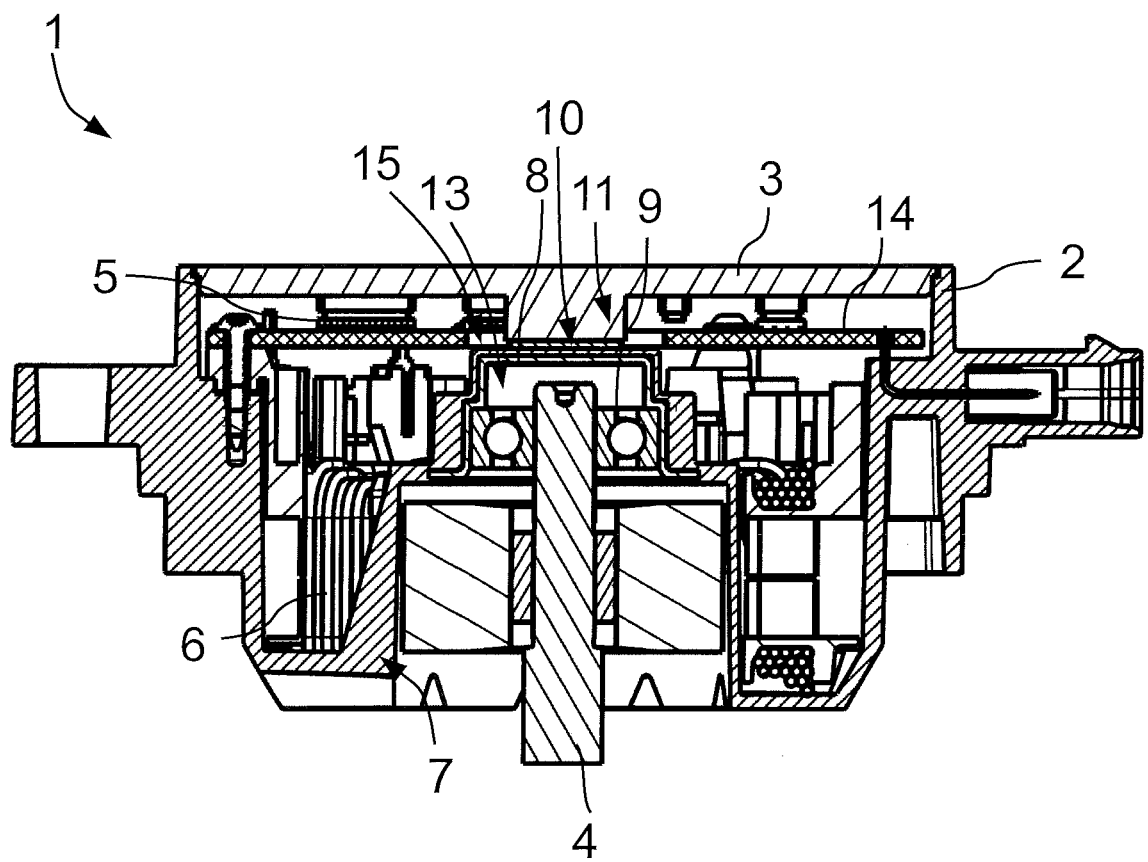
FIG. 1 is a lateral cross-sectional view through an electric motor of an embodiment example.
Figure 2:
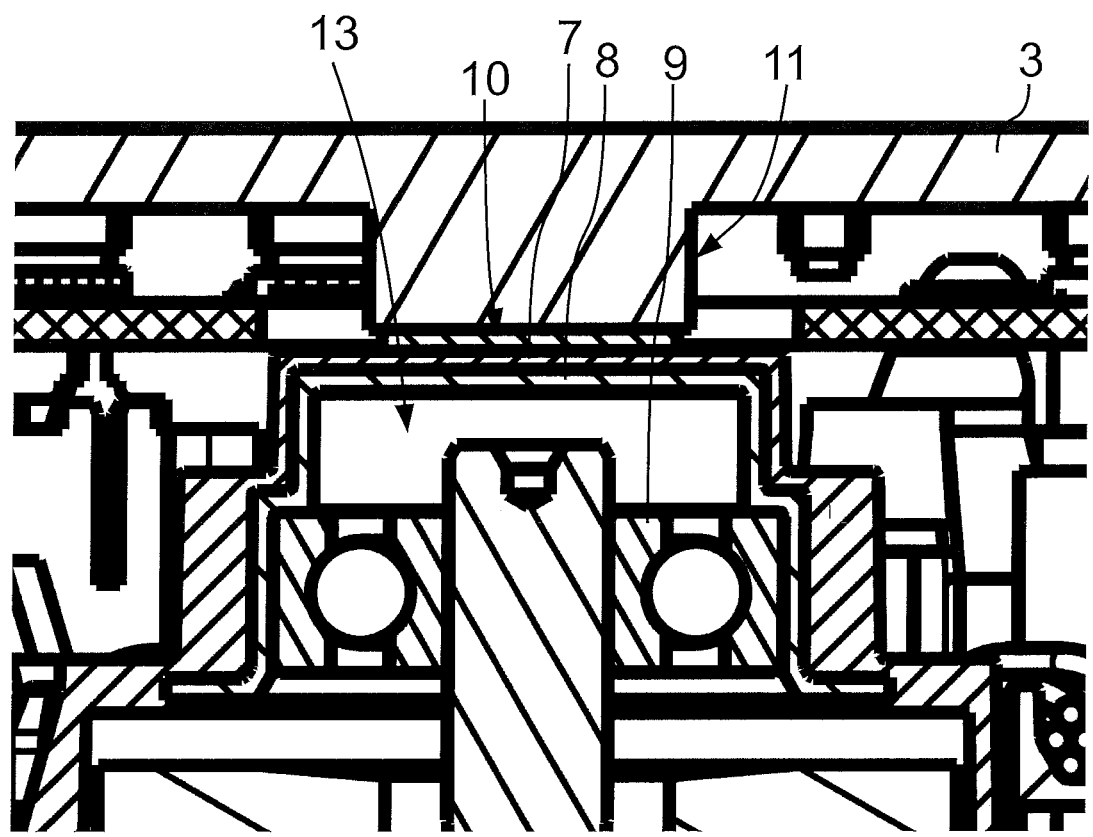
FIG. 2 is a cross-sectioned detail view from FIG. 1.

In FIGS. 1 and 2, an embodiment example of an inventive electric motor 1 is represented in a lateral cross-sectional view and a detail view, respectively.

The electric motor 1 includes a single-piece motor housing 2 with the housing cover 3 axially fixed in a detachable manner on the motor housing 2 and which, in the fixed state, forms a part of the motor housing. On the side axially facing the housing cover 3, the motor housing 2 forms, as a single piece, the separating pot 7 that extends into the interior of the motor housing 2. The motor section is located between the inner wall of the motor housing 2 and the outer shell of the separating pot 7, where the motor windings 6 and the motor electronics 5, fixed on the circuit board 14 are received. Sealingly delimited via the separating pot 7, the shaft section, where the motor shaft 4 extends along the rotation axis, is located within the separating pot 7. The separating pot 7 extends in an axial direction substantially through the entire motor housing 2 up to the housing cover 3.

In the deepest section of separating pot 7, when viewed in axial direction, the ball bearing pot 8, made of a heat conducting material, such as metal, is arranged. The motor housing 2 with the separating pot 7 is injection molded with plastic around the ball bearing pot 8 in the injection molding process. Thus, the separating pot 7 and the ball bearing pot 8 have the same shape or inner and outer contours and directly adjoin one another. The ball bearing pot 8 determines the bearing seat for the pressed-in ball bearing 9 where the motor shaft 4 is mounted. Between the ball bearing 9 and the axial inner wall surface of the separating pot 7, a free space 13 is formed. The motor shaft 4 extends with its free end into the free space 13.

A cooling element 11 around the rotation axis is positioned on the housing cover 3 and is designed to form a single piece. The cooling element 11 is in the form of a cylinder made of solid material that protrudes axially in the direction of the ball bearing pot 8. A layer of the heat sink paste 10 is provided axially between the cooling element 11 and the axial outer wall surface of the separating pot 7.

The heat dissipation of the heat generated during operation of the ball bearing 9 occurs from the ball bearing 9 onto the ball bearing pot 8. Further, it is passed onto the separating pot 7 and in axial direction, via the heat sink paste 10, onto the cooling element 11 of the housing cover 3 of the motor housing 2. From the housing cover 3, the heat is dissipated further into the outer surroundings. The motor housing 2 and, in particular, the housing cover 3 function a as cooling body. In an alternative embodiment, not shown, the heat sink paste 10 is dispensed with and the cooling element 11 is in direct contact with the separating pot 7.

The separating pot 7 is a hollow cylindric elements and subdivided into three axial sections each with different inner diameters. In the region of the smallest diameter, the free space 13 is arranged. In the central region, the bearing seat with the ball bearing 9 is arranged. In the region of the largest inner diameter, the motor windings 6 are arranged radially around the separating pot 7. The ball bearing 9 thus has no overlap with respect to the motor windings 5, when viewed in axial direction.

The circuit board 14 determines, around the rotation axis of the motor shaft 4, the central opening 15. The cooling element 11, in axial direction, axially protruding from the housing cover 3, extends through the central opening 15 to the separating pot 7. In an alternative variant, not represented, instead of the cooling element 11, the region of smallest diameter of the separating pot 7 can extend through the opening 15. Thus, the contact between separating pot 7 and cooling element 11 occurs axially above the circuit board 14. It can also be provided to design the housing cover 3 without a cooling element 11 and to move the separating pot 7 directly or via the heat sink paste 10 against the axial inner wall of the housing cover 3.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An electric motor with a motor housing comprising:
a motor housing including a shaft section for receiving a motor shaft and a motor section for receiving motor electronics and motor windings, the shaft section and the motor section are separated from each other in a sealed manner by a separating pot unitarily formed with the motor housing, a metal ball bearing pot is arranged in a closed end of the separating pot, a ball bearing is fixed in the ball bearing pot, the ball bearing pot lies indirectly against a portion of the motor housing that is connected to the outer surroundings, via the separating pot, such that the motor housing functions as a cooling body; and heat generated by the ball bearing during operation is dissipated onto the motor housing and the outer surroundings via the ball bearing pot and the separating pot.

2. The electric motor according to claim 1, wherein the separating pot is formed as a single piece through the motor housing around a rotation axis of the motor shaft.

3. The electric motor according to claim 1, wherein the separating pot and the ball bearing pot are designed to be of identical shape in the section of the separating pot in which the ball bearing pot is arranged.

4. The electric motor according to claim 1, wherein a heat sink paste is provided between the separating pot and the motor housing section which is indirectly connected to the ball bearing pot via the separating pot.

5. The electric motor according to claim 1, wherein the motor housing has a detachable housing cover that can be put on an axial side of the remainder of the motor housing motor section and which forms the section of the motor housing which is indirectly connected to the ball bearing pot via the separating pot.

6. The electric motor according to claim 5, wherein the housing cover has a cooling element protruding axially in the direction of the ball bearing pot, which locally increases a surface for connection to the ball bearing pot indirectly via the separating pot.

7. The electric motor according to claim 6, wherein the cooling element is designed with a cylindrical or conical shape with an axial surface for connection to an axial outer wall surface of the separating pot.

8. The electric motor according to claim 1, wherein the ball bearing pot forms a ball bearing seat into which the ball bearing is pressed or inserted.

9. The electric motor according to claim 1, wherein the ball bearing pot has a free space between the ball bearing and the section of the motor housing which is connected to the outer surroundings.

10. The electric motor according to claim 5, wherein the separating pot extends axially through the motor housing up to the housing cover.

11. The electric motor according to claim 1, wherein the motor housing and the separating pot are made of plastic, and a metal ball bearing pot is directly overmolded with the plastic.

12. The electric motor according to claim 1, wherein the motor windings enclose the separating pot in a circumferential direction and are arranged axially spaced from the ball bearing.

13. The electric motor according to claim 5, wherein the motor electronics is arranged on a circuit board which has a central opening, and in that the cooling element protruding from the housing cover extends through the central opening.

14. The electric motor according to claim 5, wherein the motor electronics are arranged on a circuit board that has a central opening, and the separating pot extends through the central opening.

15. An electric motor with a motor housing comprising:

a shaft section for receiving a motor shaft and a motor section for receiving motor electronics and motor windings, the shaft section and the motor section are separated from each other in a sealed manner by a separating pot arranged in the motor housing, a metal ball bearing pot is arranged in the separating pot, a ball bearing is fixed in the ball bearing pot, the ball bearing pot lies indirectly against a motor housing section that is connected to the outer surroundings, via the separating pot, such that the motor housing functions as a cooling body;

heat generated by the ball bearing during operation is dissipated onto the motor housing and the outer surroundings via the ball bearing pot and the separating pot; and the motor housing and the separating pot are made of plastic, and the ball bearing pot, made of metal, is directly overmolded with the plastic.

16. An electric motor with a motor housing comprising:

a shaft section for receiving a motor shaft and a motor section for receiving motor electronics and motor windings, the shaft section and the motor section are separated from each other in a sealed manner by a separating pot, arranged in the motor housing, a metal ball bearing pot is arranged in the separating pot, a ball bearing is fixed in the ball bearing pot, the ball bearing pot lies indirectly against a portion of the motor housing that is connected to the outer surroundings, via the separating pot, such that the motor housing functions as a cooling body;

the motor housing has a detachable housing cover that can be put on an axial side of the remainder of the motor housing and which forms the section of the motor housing that is indirectly connected to the ball bearing pot via the separating pot;

the motor electronics is arranged on a circuit board that has a central opening, and a cooling element protruding from the housing cover extends through the central opening; and heat generated by the ball bearing during operation is dissipated onto the motor housing and the outer surroundings via the ball bearing pot and the separating pot.

* * * * *